INVENTOR.
Mark H. Frank
BY
D.C. Staley
His Attorney

Nov. 21, 1961  M. H. FRANK  3,009,554
CLUTCH CONTROL
Filed Feb. 11, 1959  3 Sheets-Sheet 3

INVENTOR.
Mark H. Frank
BY D. C. Staley
His Attorney

United States Patent Office 3,009,554
Patented Nov. 21, 1961

3,009,554
CLUTCH CONTROL
Mark H. Frank, Birmingham, Mich., assignor to General Motors Corporation, Detroit, Mich., a corporation of Delaware
Filed Feb. 11, 1959, Ser. No. 792,636
5 Claims. (Cl. 192—99)

This invention relates to clutch mechanisms and particularly to those employed in automotive vehicles.

This application is a continuation in part to the parent application S.N. 320,909, Mark H. Frank, filed November 17, 1952, which has been abandoned.

Foot operated clutch mechanisms employed in automotive vehicles have spring means associated therewith to return the clutch pedal to normal position after disengagement of the clutch plates by foot operation. As is well known in the art, a relatively heavy spring or springs are employed to maintain the clutch plates in engagement. The mechanism for disengaging the clutch is of such a construction that a relatively great movement of the foot pedal will impart but a slight movement to the movable clutch plates. This produces a mechanical advantage which enables disengagement of the clutch with a comparatively small amount of physical effort. After disengagement of the clutch by operation of the foot pedal various forms of springs have been devised to return the pedal to normal position and to hold it in such normal position. Most of the springs used for this purpose are of such a nature that progressively greater effort is required to move the pedal downwardly as the pedal approaches its clutch disengaging position. In some cases considerable effort is required to depress the foot pedal.

One object of the present invention is to devise a clutch mechanism having an antirattle and pedal return spring associated therewith which is so constructed and arranged that no substantial increase in pressure is imposed thereby on the clutch pedal during movement of the latter from its normal position to its fully clutch disengaging position.

Another object is to provide a clutch pedal operating mechanism having spring means associated therewith of such a nature that as the tension of the spring increases, the moment arm about which the force of the spring is transmitted to the pedal mechanism progressively decreases, thereby decreasing the resultant force required to operate the foot pedal.

Another object of the invention is to provide spring means to take up clearances in the clutch release linkage mechanism to eliminate rattles without substantially increasing the clutch pedal effort.

Another object of this invention is to provide a decreasing effective moment arm operating in connection with the clutch pedal return spring and an assisting force produced by an overcenter spring operating on an increasing effective moment arm on the clutch pedal to compensate for the increased force of the clutch engaging springs when the vehicle clutch is disengaged.

Another object is to provide a clutch operating mechanism which is simple in construction, highly efficient in operation and economical in manufacture.

Other and further objects will become apparent as the description of the invention progresses.

Figure 1:
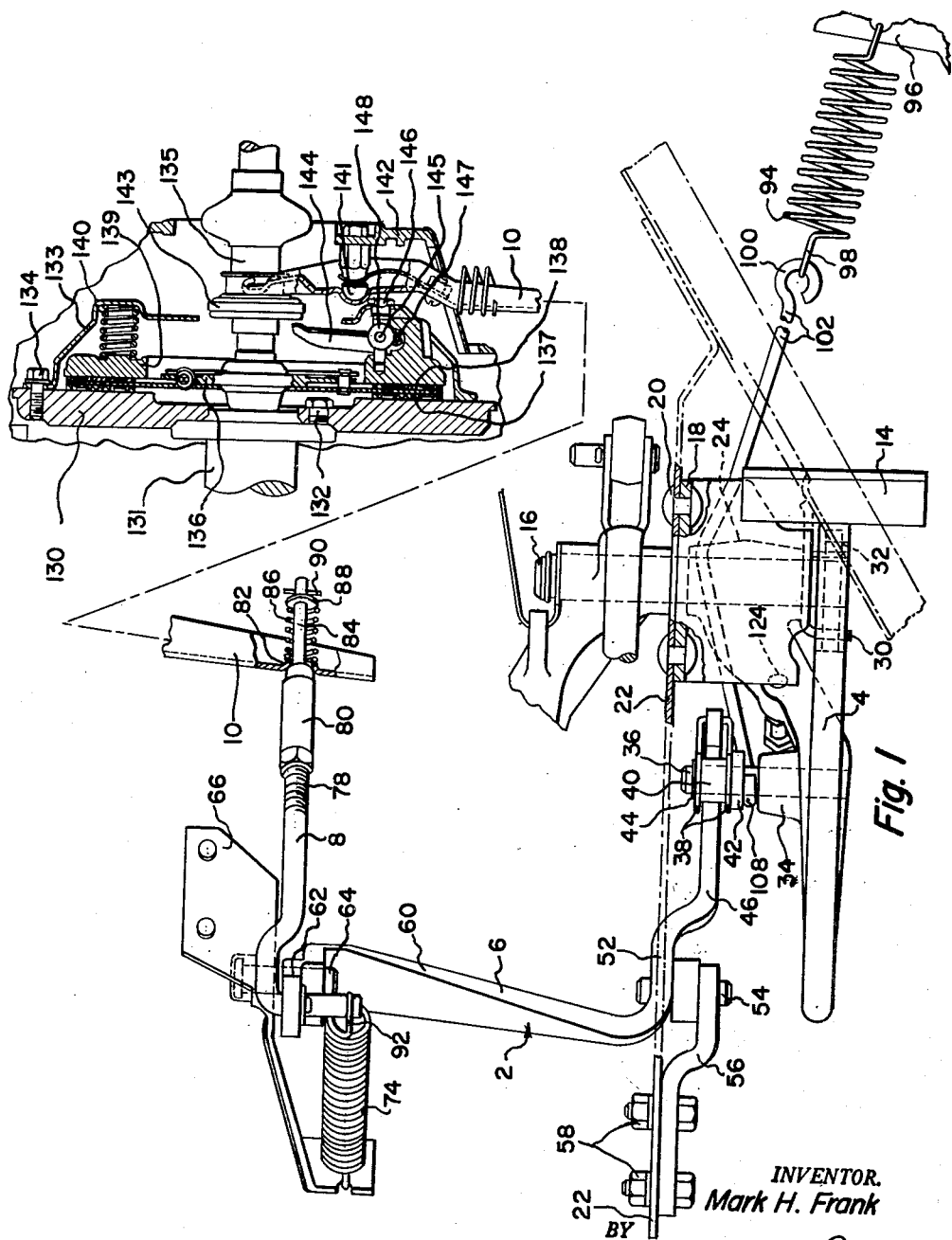
FIG. 1 is a plan view, partly in section, of the clutch operating mechanism in connection with the clutch comprising the present invention, parts of the floor board and adjacent brake operating mechanism being removed to more clearly disclose the various features thereof.
Figure 2:
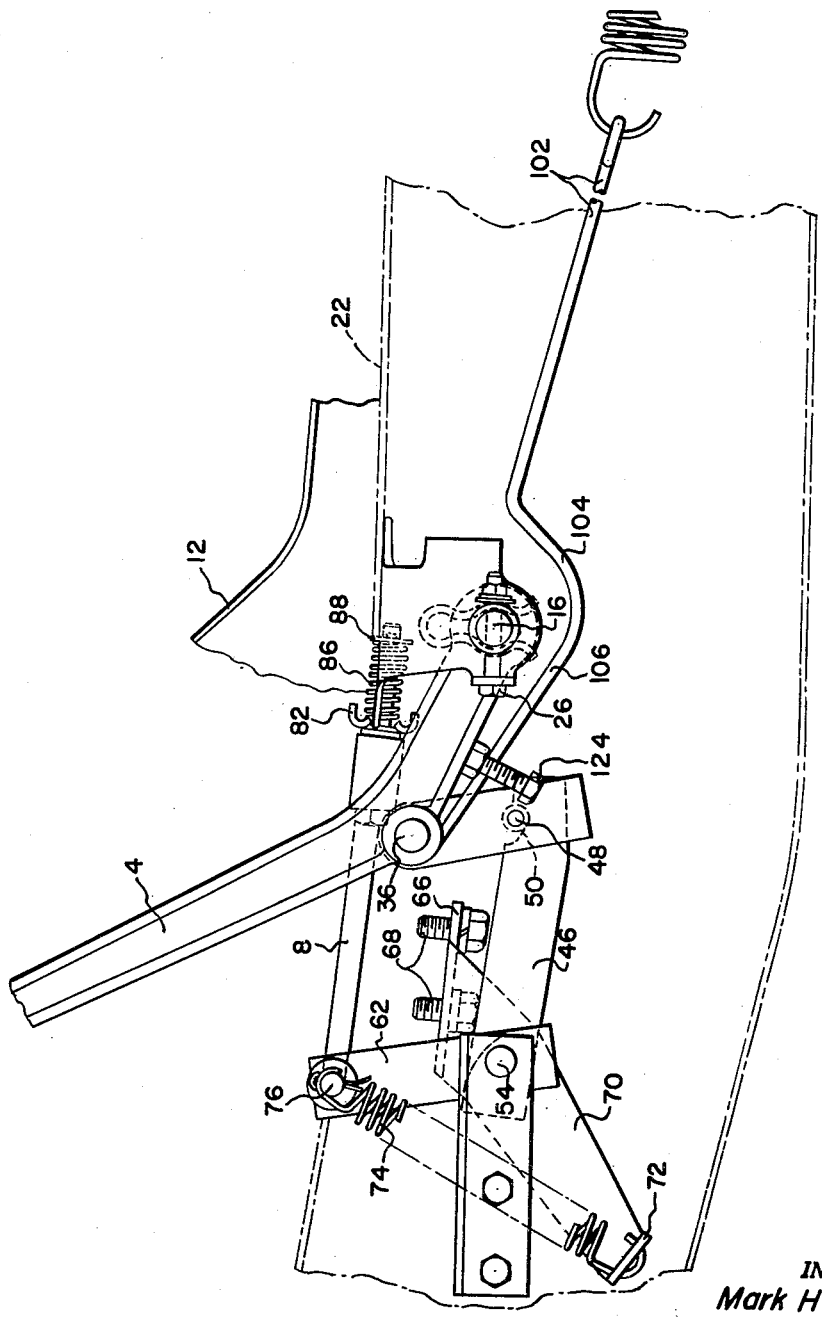
FIG. 2 is a side elevational view of the clutch operating mechanism shown in FIG. 1, parts being broken away to illustrate certain features thereof.

Referring to the drawings, and particularly to FIGURES 1 and 2, the numeral 2 designates generally the clutch operating mechanism comprising the present invention, which consists generally of a pedal operated operating arm 4 operatively connected to an intermediate swingable motion transmitting multi-armed member 6 which in turn is connected to an adjustable link 8 operatively connected by means of a fork arm 10 to a clutch. The operating arm 4 is of gooseneck construction and extends upwardly through the floor board 12 and into the passenger compartment of the vehicle and terminates at its upper end in an extended pedal 14. Arm 4 is pivotally mounted on a pin 16 secured in a mounting bracket 18 which in turn is secured by rivets 20 to the supporting framework 22 of the vehicle. As shown more particularly in FIGURE 1, arm 4 has mounted at the lower end thereof an extended hub 24, which is journalled on the pin 16. The pin 16 is secured to bracket 18 by a bolt 26 which extends through aligned apertures provided in the pin and in extensions 30 and 32 of said bracket. Disposed forwardly of hub 24, arm 4 has provided thereon a laterally extending apertured boss 34 in which is secured a pin 36, having a pair of spaced arms 38 mounted near the inner end thereof. Arms 38 are held in spaced relation on the pin 36 by a spacing washer 40 and are held against axial movement along said pin by lock nuts 42 and 44. Arms 38 straddle the righthand end of one arm 46 of intermediate member 6 and have a pin 48 secured thereto which extends into an extended notch or open slot 50 provided in the said arm 46. Arm 46 is provided with a substantially parallel inwardly offset portion 52 which is journalled on a pin 54 secured in a bracket 56 which in turn is secured by bolts 58 or other suitable securing means to the vehicle frame 22. The left-hand end of portion 52 terminates in an enlarged transversely extending portion 60, which in turn terminates in an upwardly extending second arm 62 journalled on a pin 64 secured in a bracket 66, which in turn may be secured by bolts 68 or other suitable means to the cylinder block of the vehicle engine, not shown. Pins 64 and 54 are disposed in axial alignment and thereby form pivotal supports which assure proper rotary movement of member 6 during operation of the mechanism. Bracket 66 is provided with a forwardly and downwardly extending portion 70 which terminates in a transverse portion 72 to which the lower end of a pedal return spring 74 is attached. The upwardly extending arm 62 of member 6, as shown particularly in FIGURE 2, inclines slightly forwardly from pin 64 and has a transversely extending aperture provided at the upper end thereof for receiving the transversely extending end portion 76 of link 8. Link 8 is provided with a threaded portion 78 intermediate its ends for receiving an elongated adjusting member 80 which engages an apertured boss 82 provided near the lower end of fork arm 10. The outer portion 84 of link 8 is somewhat reduced, as shown in FIGURE 2, and has mounted thereon a coil spring 86. Spring 86 at one end thereof engages the righthand side of boss 82, the other end engaging a spring seat 88. Spring seat 88 as well as spring 86 are held in position by a cotter key 90. A resilient connection is thus disposed between one side of arm 10 and link 8 which provides for separation of the clutch release bearing from the clutch plate except when the clutch is being disengaged. The inner end of the laterally extending end portion 76 of link 8 is provided with an annular groove for receiving the upper hook 92 of spring 74.

The vehicle clutch is shown in FIGURE 1 and includes the following interrelated parts. The flywheel 130 is driven by the vehicle engine, not shown, through the drive shaft 131. The flywheel 130 is connected by a plurality of bolts 132, of which one is shown, to a flange on the drive shaft 131. A cover 133 is bolted to the flywheel by means of a plurality of bolts 134 of which one is shown. The cover 133 rotates with the flywheel 130 at all times when the drive shaft 131 is rotating. The driven shaft 135 is connected to the driven plate 136. The driven shaft 135 extends rearward to drive the vehicle wheels, not shown. The driven plate 136 is provided with friction material 137 and 138 on the forward and rearward facings on its radially outer portion. The friction material on the forward facing of the driven plate 136 frictionally engages a planar face on the rearward side of the flywheel 130. The friction material 138 on the rearward side of the driven plate 136 frictionally engages a planar surface on the forward side of the pressure plate 139. A plurality of coil springs 140, of which a single spring is shown, are employed to maintain a pressure between the friction material and the corresponding planar surfaces on the pressure plate and the flywheel. The rotation of the flywheel 130 and the pressure plate 139 is transmitted through the driven disk 136 to the driven shaft 135.

When the vehicle clutch is disengaged, the fork arm 10 is pivoted against the spherical head 141 mounted on the housing 142. This action forces the throw-out collar 143 axially forward on the shaft 135. The forward movement of the collar 143 contacts the radially inner end of a plurality of release levers 144, of which one is shown. The release lever 144 is shown pivoting about a pin 145 on a bolt 146. The bolt 146 is mounted on the cover 133. The release lever 144 operates through a strut 147 which forces the pressure plate 139 axially rearward and thereby releasing the driven clutch plate 136. This permits free rotation of the driven plate 136 relative to the flywheel 130.

As shown in FIGURES 1 and 2, an overcenter spring 94 is secured at one end to a bracket 96, which in turn is secured to the vehicle frame 22 or to any other fixed support. The opposite end 98 of spring 94 is hooked through the eye 100 of an elongated irregular shaped connecting rod 102. As shown in FIGURE 2, rod 102 is bent downwardly, as shown at 104, intermediate its ends and then extends forwardly and slightly upwardly, as shown at 106, and the foremost end thereof is provided with a hook 108 which engages pin 36 at the portion thereof disposed between the inner end of boss 34 and the outer surface of lock nut 42. FIGURE 2 shows the parts in normal position wherein it will be observed that the axis of spring 94 lies slightly above the axis of pin 16 and consequently the said spring will exert an upward force on arm 4 tending to maintain the said arm in its upper normal position of adjustment. When arm 4 is actuated downwardly or in a counterclockwise direction about pivot 16, pin 36 will move downwardly causing the axis of spring to fall below the axis of the pivot 16 and, consequently, the said spring will exert a downward movement on arm 4 and thereby assist the operator in depressing the pedal to clutch disengaging position. It will be observed that when arm 4 is depressed downwardly pin 48 actuates arm 46 downwardly about pivots 54 and 64 causing the vertical arm 62 to move rearwardly or in a clockwise direction about said pivots thereby actuating link 8 to the right, which in turn actuates fork lever 10 correspondingly to effect disengagement of the clutch. Upon movement of arm 62 in this manner, it will be observed that spring 74 will be placed under progressively greater tension since the point 76 will move in an arc away from spring support 72. It will also be observed that the axis of spring 74 will progressively move nearer the axis of pins 54 and 64 and, consequently, the moment arm which operates on arm 62 tending to resist the pedal actuated motion thereof becomes progressively shorter. The parts are so designed that the progressive shortening of the moment arm in effect substantially offsets the progressive increase in tension of spring 74 and thus the resultant force required to actuate the clutch arm 10 is not increased materially due to said spring during movement of the pedal from normal position to its fully clutch disengaging position.

The disengagement of the vehicle clutch is accomplished by depressing the clutch pedal which operates through the clutch actuating linkage to the actuating link 8 and clutch arm 10. As the link 8 is moved rearward, the throw-out collar 143 moves forward to engage the radially inner ends of the release levers 144. Each release lever is pivoted on a pin 145 which remains stationary in the lever and rolls in a hole of the eye bolt 146. The radially outer end of each release lever moves the pressure plate 139 through the struts 147, which provides contact between the outer end of the lever 144 and the pressure plate 139. The outer ends of the eye bolts extend through holes in the cover 133 to provide a mounting. The rearward movements of the radially outward ends of the throw-out levers 144 compress the springs 140 and release the driven clutch plate 136. The greater the movement of the pressure plate 139 against the springs 140, the greater the force created by the springs 140. As the springs 140 are compressed under increased pressure, the clutch pedal return spring 74 is also increasing in tension but it is operating on a decreasing effective moment arm and, therefore, the rotative torque created by this spring does not increase.

In the pedal return position, the axis of overcenter spring 94 passes through a point above the pivoting axis of the clutch pedal on the vehicle frame. Upon rotation of the pedal, the axis of the overcenter spring pivots downward passing through the pivoting axis of the clutch pedal. Any further rotation of the clutch pedal beyond this point will create an assisting force of the overcenter spring for the operator of the vehicle clutch pedal and tend to decrease the required force applied to the clutch pedal for further movement of the clutch pedal. This spring in effect compensates for the added force required to compress the clutch springs 140 and thereby provides a relatively constant actuating force on the clutch pedal throughout the stroke of the pedal in disengaging the clutch.

Figure 3:
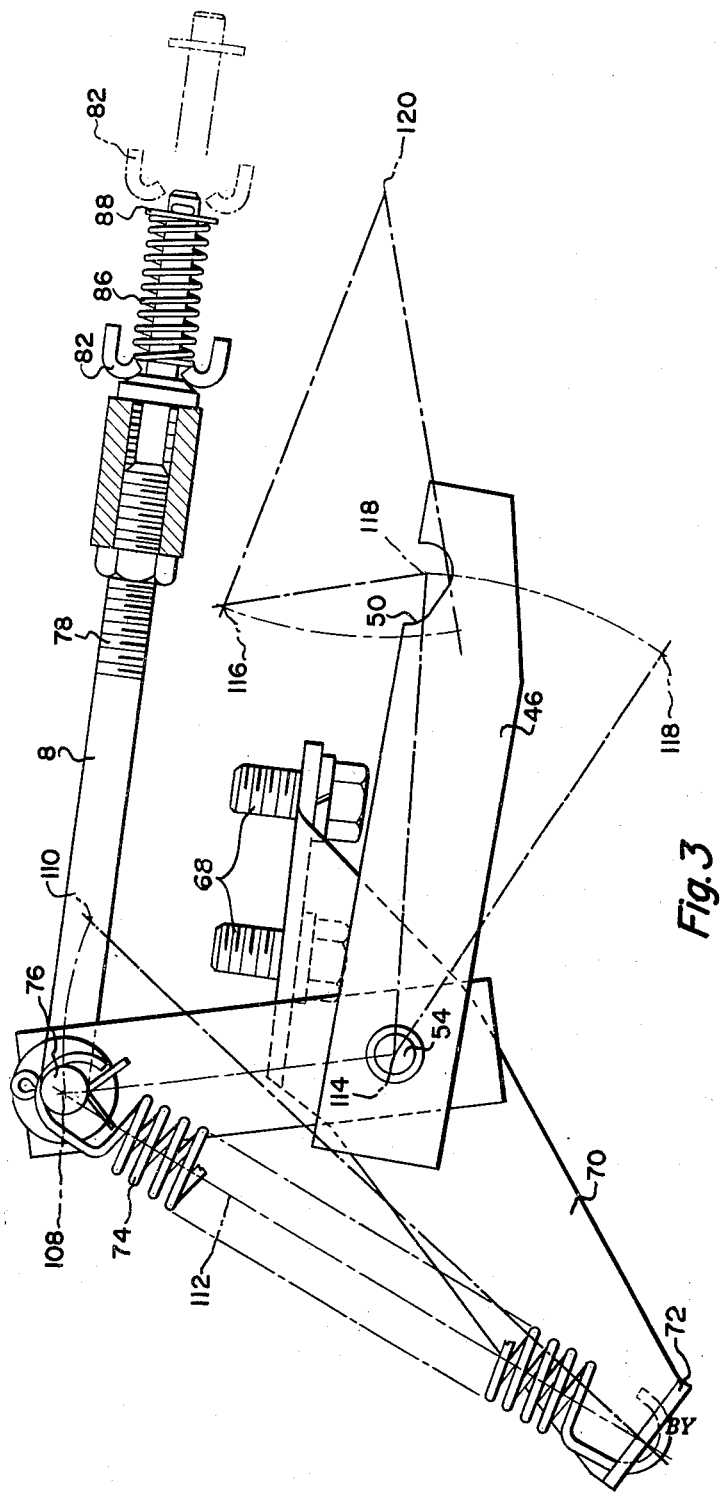
FIG. 3 is a side elevational view, partly in section and partly diagrammatic of a portion of the clutch operating mechansim showing the ranges of movement of various of the elements thereof.

FIGURE 3 shows the ranges of movement of the various parts from a normal position to clutch disengaging position. As shown therein it will be observed that the axis of pin 76 will move between the points indicated at 108 and 110 during actuation from normal position to its full clutch disengaging position. During this motion the axis 112 of spring 74 will have moved to the broken line position shown therein and, consequently, is brought into closer proximity with the axis 114 of pin 64. The center line or the axis of pin 36 is indicated at 116, the axis of pin 48 is shown at 118 and the axis of pin 16 is indicated at 120. A stop bolt 124 is carried by operating lever 4 and is adapted to engage a fixed abutment such as the under side of bracket 18 to limit the swinging movement of said lever. By adjusting bolt 124 the normal position of lever 4 may be varied and consequently the angle through which the parts swing to effect disengagement of the clutch may also be varied. Bolt 124 also maintains clearance between pedal shank and the floor boards so that the floor board will not cause partial disengaging of the clutch.

From the foregoing description it is seen that a simplified and highly efficient clutch operating mechanism has been provided. The pedal return spring and the various parts associated therewith are so disposed that return of the pedal to normal position not only is assured but the force required to effect disengagement of the clutch is reduced.

While but a single embodiment of the invention has been shown and described herein, it will be apparent to those skilled in the art that other embodiments may be made without departing from the invention. It therefore is to be understood that it is not intended to limit the invention to the single embodiment disclosed but only by the scope of the claims which follow.

What is claimed is as follows:

1. In a device of the class described, the combination of a fixed support, a swingable member, first pivot means for pivotally supporting said swingable member on said support about a first axis, a pair of arms extending from said swingable member, a clutch lever return spring operatively connected between said support and one of said arms with the spring axis substantially in the plane of rotation and forming an acute angle with said one arm so that pivotal movement of said swingable member increases tension of said clutch lever return spring yet progressively offsets the moment force of torque therefrom by shifting said one arm to shorter effective length relative said clutch lever return spring about the first axis, a manually operated clutch lever, an arm on said clutch lever, said clutch lever connected to said second arm of said swingable member through said arm on said clutch lever for actuating said swingable member in one direction, second pivot means for pivotally supporting said clutch lever on said support about a second axis parallel to the first axis, a third pivot means on said lever parallel to and spaced from said second axis for pivotally supporting said arm member on said clutch lever about a third axis, said arm member on said clutch lever extending to engage and effect movement of said second arm of said swingable member when said clutch lever is operated, an over center spring means connected at one end to said fixed support and at the other end to said clutch lever at a point in said third axis, said overcenter spring means having a longitudinal axis capable of intersecting the axis of said second pivot means during shifting of the spring axis by movement of said clutch lever shifting the pivot in the third axis, said lever being subjected to a force due to said overcenter spring means tending to maintain the pivot point of the third axis to a rest position when the axis of said overcenter spring means is at one side of said second pivot means thereby resisting manual operation of said lever, said lever being subjected to a force due to said overcenter spring means assisting movement of said lever after the axis of said overcenter spring means has crossed the axis of said second pivot means, said clutch lever return spring and said overcenter spring means coacting in the combination to compensate for the increasing force of the clutch spring in disengaging the vehicle clutch.

2. In a device of the class described, the combination of a fixed support, a swingable member, first pivot means for pivotally supporting said swingable member on said support about a first axis, a first arm extending from one side of said swingable member, a second arm extending from the opposite side of said swingable member, a clutch lever return spring operatively connected between said support and said first arm and operating in substantially the plane of rotation of said first arm so that pivotal movement of said swingable member increases tension of said clutch lever return spring yet progressively offsets the moment force of torque therefrom by shifting said first arm to a position of shorter effective length relative said clutch lever return spring about the first axis, a manually operated clutch lever carrying arm means for actuating said swingable member in one direction, second pivot means for pivotally supporting said clutch lever on said support about a second axis parallel to the first axis, a third pivot means on said lever parallel to and spaced from said second axis for pivotally supporting said arm means about a third axis, said arm means extending to engage and effect movement of said second arm of said swingable member when said clutch lever is operated, an overcenter spring connected at one end to said fixed support and at the other end to said clutch lever at a point in a third axis parallel to and pivotable about the axis of said second pivot means, said overcenter spring having a longitudinal axis capable of intersecting the axis of said second pivot means during shifting of the spring axis by movement of said lever shifting the pivot in the third axis to the opposite side of a neutral axis, said neutral axis coinciding with said spring axis when said spring axis is intersecting the axis of said second pivot means, said lever being subjected to a force due to said overcenter spring means tending to maintain the pivot point of the third axis to a position at one side of the neutral axis intersecting said second pivot means, said lever being subjected to a force due to said overcenter spring assisting movement of said lever after the axis of said overcenter spring has crossed the axis of said second pivot means, a spring biased clutch, a clutch operating member, a link including a length-adjusting means therewith pivotally attached at one end to said first arm at said swingable member and at the opposite end engaging said clutch operating member, said link having an outer portion extending through said clutch operating member, and a link spring concentrically disposed about said outer portion exerting a coaxial force therewith against said clutch operating lever and retained thereagainst, said clutch lever return spring and said overcenter spring coacting in the combination to reduce lever actuating force.

3. In a device of the class described, the combination of a fixed support, a swingable member, first pivot means for pivotally supporting said swingable member on said support about a first axis, a pair of arms extending from said swingable member transversely to the first axis, a clutch pedal return spring operatively connected between said support and the first of said pair of arms, an actuating link pivotally connected to said first arm, an arm for engaging the clutch mechanism connected to said link, said vehicle clutch including a driving and a driven member, a clutch plate, a plurality of clutch springs said driven member frictionally held in contact with said clutch plate by means of said clutch springs, said springs effecting a constantly increasing rate of force as said vehicle clutch is disengaged, a clutch pedal lever, a pivoting arm on said clutch lever, said pivoting arm on said clutch lever actuating said swingable member in such a manner as to progressively increase the tension of said clutch pedal return spring so the increased tension is progressively offset by a decreasing effective moment arm to effect a relatively constant counter-torque, second pivot means pivotally supporting said clutch pedal lever on said support about a second axis parallel to the first axis, said pivoting arm pivotally connected to said clutch pedal lever radially spaced from said second mentioned axis on said clutch pedal lever, said pivoting arm pivotally mounted on said clutch pedal lever and extending to a point adjacent to the second arm of said pair of arms of said swingable member to pivotally contact said second arm to pivot said swingable member upon actuation of said clutch pedal lever, an overcenter spring connected at one end to said fixed support and at the other end to said clutch pedal lever at a point on the pivotal connection of said pivoting arm with said clutch pedal lever, said spring having a longitudinal axis capable of intercepting the axis of said second pivot means during the shifting of the spring axis by movement of said clutch pedal lever from the retracted position of said pedal lever, the retracted position of said pedal lever being when the longitudinal axis of said overcenter spring intersects a point above said second axis and the force of said overcenter spring maintains the pedal lever in a retracted position, upon depression of the pedal lever, said longitudinal axis of the overcenter spring shifts through said second axis and the force of said overcenter spring thereby assisting the rotation and disengagement of said vehicle clutch as said clutch pedal return spring operates against a decreasing moment arm thereby compensating for the increased force required to further disengage said vehicle clutch.

4. In a device of the class described, the combination of a fixed support, a swingable member, first pivot means for pivotally supporting said swingable member on said support about a first axis, a pair of arms extending from said swingable member transversely to the first axis, a clutch pedal return spring connecting said support at one end and at the other end to a first arm of said pair of arms on said swingable member, a clutch actuating link pivotally connected to said swingable member at the point which said pedal return spring connects with said first arm, a clutch operating arm, said clutch actuating link extending to said clutch operating arm, a vehicle clutch mechanism connected to said clutch operating arm, said vehicle clutch including a driven member and a driving member, a vehicle clutch plate connected to said driven member for frictionally engaging said driving member and maintained in frictional contact in the engaged position by resilient means effecting a constantly increasing force as the vehicle clutch is disengaged, a manually operated clutch pedal lever, a pivoting arm on said clutch pedal lever actuating said swingable member in one direction in such a manner as to progressively increase the tension of said clutch pedal return spring operating against a constantly decreasing effective moment arm as said swingable member is pivoted by said clutch pedal lever, second pivot means for pivotally supporting said clutch pedal lever on said support about a second axis parallel to the first axis, said pivot arm pivotally supported on said clutch pedal lever radially spaced from said second axis, said pivoting arm extending to a point adjacent to the second arm of said pair of arms of said swingable member to pivotally contact and actuate said swingable member when said clutch pedal lever is depressed, an over center spring connected at one end to said support member and at the opposite end to said clutch pedal lever at a point on said pivot means of said pivoting arm, said overcenter spring having a longitudinal axis capable of shifting from one side of said second axis to the opposite side when said pedal lever is depressed, said longitudinal axis of said overcenter spring passing through a point on one side of said second axis and said spring maintaining said pedal lever in a retracted position by creating a countertorque on said pedal lever, said longitudinal axis of said overcenter spring shifting through said second axis when said clutch pedal lever is depressed and said overcenter spring creating a rotative torque to assist the further depression of said pedal lever and compensate for increasing force required to disengage said vehicle clutch, said clutch pedal return spring operating against a constantly decreasing effective moment arm as said clutch pedal lever is depressed, thereby providing a relatively constant actuating force for disengaging said vehicle clutch throughout the stroke of said pedal lever.

5. In a device of the class described, the combination of a fixed support, a swingable member, a first pivot means for pivotally supporting said swingable member on said support about a first axis, a pair of arms extending from said swingable member transversely to said first axis, a linkage arrangement connected to the first arm of said pair of arms, a vehicle clutch including a plurality of engaging springs effecting an effort during disengagement of said vehicle clutch, said linkage arrangement connected to said vehicle clutch, a clutch pedal return spring operatively connected to said support and said first of said pairs of arms so that the pivotable movement of said swingable member increases tension of said clutch lever return spring yet progressively offsets the moment force of torque therefrom by shifting said first arm to a position of shorter effective length relative to said clutch lever return spring about said first axis, a manually operated clutch pedal lever, a pivotally connected arm connected to said clutch pedal and to the second of said pair of arms of said swingable member, said clutch pedal actuating said swingable member in one direction through said pivotally connected arm, second pivot means for pivotably supporting said clutch pedal lever on said support about a second axis parallel to said first axis, an overconter spring connected at one end to said fixed support and at the other end to said clutch lever, said overcenter spring having a longitudinal axis capable of intersecting the axis of said second pivot means during shifting of the spring axis by movement of said lever shifting the pivot to the opposite side of said spring axis, a neutral position being when said spring axis is intersecting the axis of said second pivot means, said lever being subjected to a force in its retracted position tending to maintain said spring axis to a position on one side of said second pivot means when said pedal is in the retracted position, said lever being subjected to a force due to said overcenter spring assisting movement of said lever after the axis of said overcenter spring has crossed the axis of said second pivot means, said overcenter spring thereby compensating for the increased force in the compression of the clutch springs when said vehicle clutch is disengaged.

References Cited in the file of this patent

UNITED STATES PATENTS

| | | |
|---|---|---|
| 2,275,388 | Wemp | Mar. 3, 1942 |
| 2,296,535 | Nutt | Sept. 22, 1942 |
| 2,311,997 | Pearson | Feb. 23, 1943 |
| 2,324,021 | Plexico | July 13, 1943 |